United States Patent [19]

Gilchrist

[11] Patent Number: 5,615,046
[45] Date of Patent: Mar. 25, 1997

[54] STEREOSCOPIC VIEWING SYSTEM

[75] Inventor: Ian R. Gilchrist, Timonium, Md.

[73] Assignee: Cyber Scientific Inc., Baltimore, Md.

[21] Appl. No.: 376,785

[22] Filed: Jan. 23, 1995

[51] Int. Cl.$^6$ ............................ G02B 27/22; G02B 27/02; G02B 27/24

[52] U.S. Cl. ........................ 359/464; 359/480; 359/466; 359/472

[58] Field of Search ........................ 359/464, 465, 359/466, 472, 473, 462, 477, 474; 348/42, 51, 54; 345/6

[56] References Cited

U.S. PATENT DOCUMENTS

| | | |
|---|---|---|
| 76,472 | 4/1868 | Kohl . |
| 1,186,786 | 6/1916 | Huber et al. . |
| 1,520,311 | 12/1924 | Ruth . |
| 2,528,673 | 11/1950 | Taylor ........................................ 88/29 |
| 2,849,917 | 9/1958 | Petri . |
| 4,174,884 | 11/1979 | Weissler ................................. 350/138 |
| 4,559,556 | 12/1985 | Wilkins ................................... 359/465 |
| 4,568,970 | 2/1986 | Rockstead ............................... 358/91 |
| 4,730,898 | 3/1988 | Curtin ..................................... 350/133 |
| 4,740,836 | 4/1988 | Craig ....................................... 359/464 |
| 4,754,327 | 6/1988 | Lippert .................................... 359/470 |
| 4,913,541 | 4/1990 | Wakayama ............................... 359/474 |
| 4,952,024 | 8/1990 | Gale ......................................... 350/143 |
| 4,986,632 | 1/1991 | Eckmann ................................. 350/131 |
| 5,084,781 | 1/1992 | Gregorio ................................. 359/466 |
| 5,124,840 | 6/1992 | Trumbull et al. ...................... 359/472 |
| 5,126,878 | 6/1992 | Trumbull et al. ...................... 359/472 |
| 5,192,960 | 3/1993 | Komamura ............................. 359/462 |
| 5,218,470 | 6/1993 | Mizukawa et al. .................... 359/474 |
| 5,357,369 | 10/1994 | Pilling et al. .......................... 359/462 |

*Primary Examiner*—Paul M. Dzierzynski
*Assistant Examiner*—Audrey Chang
*Attorney, Agent, or Firm*—Perman & Green

[57] ABSTRACT

A stereoscopic viewer includes left and right lenses and sight blocks, all housed in the lightweight frame. A stereoscopic display, such as a computer monitor or a TV, includes left and right stereoscopic central images that are displayed side-by-side on the central portion of the display screen. The left and right central images have center spacings equivalent to normal interpupillary distances. However, the left central image is extended to the left to form a left peripheral zone and the right central image is extended to the right to form a right peripheral zone. A user employing the viewer integrates the central stereoscopic views with the left and right peripheral zones to form an apparent 3-dimensional image. Additional two-dimensional zones may be established outside of the stereoscopic central images for items such as menus, windows, tool icons, etc.

11 Claims, 4 Drawing Sheets

STEREOSCOPIC VIEWING SYSTEM

FIELD OF THE INVENTION

This invention relates to stereoscopic systems that allow a person to perceive stereoscopic images from left and right images displayed on a computer monitor or TV and, more particularly, to a stereoscopic system for viewing an image with a large field-of-view, employing a simple and inexpensive visor or glasses.

BACKGROUND OF THE INVENTION

There are many techniques for viewing stereoscopic images. Techniques using polarized glasses, LCD glasses, lenticular screens, interleaved screens and two separate screens employ specialized processes that require additional hardware and expense. Anaglyphic methods using red/green glasses are inexpensive and simple to implement, but the filters distort the color images and can be difficult to use for extended periods of time.

Split images (adjacent side-by-side images on a screen) provide faithful color and image reproduction. Devices using side-by-side left and right images date back to the late 1800's. There are many patents on stereoscopic viewers using standard interpupillary distances, with left and right images viewed at short focal lengths in a hand held fixture. Other patents describe hand held viewers or glasses for viewing left and right stereoscopic images from greater distances. Some patents describing viewers or glasses include U.S. Pat. No. 1,520,311 (Ruth), U.S. Pat. No. 2,849,917 (Petri), U.S. Pat. No. 4,730,898 (Curtin), and U.S. Pat. No. 4,986,632 (Eckmann). The devices usually contain lenses or lens prisms, and some form of light block to separate the left and right images.

Left and right images formed on a single screen may also be viewed with glasses that contain mirrors that increase the center distance between left and right screen images. An extension to this concept is presented in U.S. Pat. No. 5,357,369 (Pilling et al) where mirrors are placed in a hood mounted on the display and rotate the image 90 degrees to fill the entire screen with the left and right images. U.S. Pat. No. 5,126,878 (Trumbull et al) presents another split screen approach which uses horizontal compression techniques and employs special glasses that expand the viewed image back to correct proportions.

There is a need for a stereoscopic viewing system that uses a standard display and, which can be viewed with glasses or a visor employing inexpensive and non-critical components. The system should achieve the largest viewing screen area possible for increased image resolution, while maintaining correct color and image proportions. Ideally, the system should also reduce image processing requirements by minimizing the image area containing overlapping visual information.

SUMMARY OF THE INVENTION

This invention uses a stereoscopic visor (or glasses), with left and right lenses and a sight block baffle. A display, such as computer monitor or TV, displays left and right stereoscopic images, side-by-side on a central portion of a screen. The left and right images have center-to-center spacings equivalent to normal interpupillary distances (55 to 65 mm). However, the left image is extended to the left of the central stereo image area to form a left peripheral zone, and the right image is extended to the right of the central stereo image area to form a right peripheral zone. The brain integrates the central stereoscopic view with the left and right peripheral zones to form an apparent three-dimensional image for the entire display. Additional two dimensional zones can be set up outside the stereoscopic area for separate objects such as menus, windows, or tool icons while still viewing from the visor.

The stereoscopic viewer worn by the user may take the shape of either a visor or a pair of glasses. While the basic principles of the visor and glasses are the same, there are advantages to each configuration. A pair of glasses contains two lenses with inner opaque vision blocks to separate the left and right image. An example of this type of viewer is shown in U.S. Pat. No. 2,849,917 (Petri). A visor contains lenses and light blocks, but the light blocks are moved further in front of the eyes for improved left and right image separation and reduced eye strain. An example of an extended light block baffle is shown in U.S. Pat. No. 1,520,311 (Ruth). Therefore, the glasses have the advantage of convenience, but the visor provides improved performance. Hereafter, the term visor will be used, but it should be understood that glasses and visors are functionally interchangeable.

One criteria for this stereoscopic system is to use a visor that contains simple and non-critical components to reduce cost and weight. Use of mirrors, prisms, or other light bending techniques are avoided as they require more critical components with rigid and precise frame enclosures. The invention employs a simple pair of plano-convex, double convex or meniscus lenses, with a large effective focal length (for increased distance to the display screen) and extended sight block baffles. The interpupillary eye distances may be offset from the center of the lenses to increase the side peripheral views and provide more comfortable viewing. There are no critical mounting requirements, therefore a lightweight and inexpensive material, such as cardboard or plastic, may be used for the frame. In the simplest form, the visor consists of only two simple lenses and a cardboard frame.

The visor is designed to allow some head movement, while still maintaining the stereo image on the screen. The focal length of the lens is selected to allow the user to sit at a comfortable distance from the display. Simple plano-convex, double convex or meniscus lenses provide a reasonable focal travel distance while viewing the virtual image, allowing the user some back and forth head motion. The inner sight block baffles block a central band of the left and right screen image, allowing the user some lateral (side to side) head motion. Outer sight block baffles may also be used to frame the display, so that the user sees only the screen. If inner and outer light block baffles are used, short tunnels are formed for each eye, which helps to reduce external light and provides an improved screen image. To view the stereoscopic image, the user moves towards the display until the image comes into focus, and then moves to the left and right until the separate images merge into one stereoscopic image.

A second criteria of this system is to use a standard display for image viewing, so that no additional cost for special hardware is required. This system splits the display into plural image zones. These areas are called the left and right central zones, left and right peripheral zones, and left and right 2D zones. The central image zones contain left and right (side-by-side) images with an image center-to-center distance separation equivalent to the normal interpupillary distance. As an example, if the interpupillary distance is selected to be 60 mm, then the left central image is 60 mm wide, the right central image is 60 mm wide, and the two images butt against each other directly in the center of the screen. It is preferable not to have a dividing line between the images to maximize the effective screen area. The horizontal distance of the central left and right image zones never exceeds the interpupillary distance regardless of the display width size, but the vertical distance may extend over the entire display height.

The left image is extended to the left of the central image zone area to form the left peripheral zone, and the right image is extended to the right of the central image zone to form the right peripheral zone. The brain integrates the left and right central stereoscopic images with the left and right peripheral zones to form an apparent three-dimensional image for the entire area. While the width of the left and right central zones are always locked at the interpupillary distance, the widths of the left and right peripheral zones may be extended for any distance, enabling use of any size monitor. Since the eyes tend to focus at the center of a viewed image, the perceived stereoscopic effect is complete, and the side peripheral zones are viewed as natural extensions of the centrally viewed field. If the eyes shift to focus on objects in the peripheral zones, the stereoscopic effect becomes less pronounced, however the image always maintains a correct visual geometry since the left peripheral zone is an extension of the left eye view, and the right peripheral zone is an extension of the right eye view.

The central and peripheral zones allow large screen viewing of stereoscopic images, however two dimensional objects can be viewed, as long as the images are totally separated from the left and right eyes. Therefore, if two dimensional objects such as menus, icons, buttons etc. are required, the objects may be viewed as non-stereoscopic superimposed images. As an example, if two dimensional menus are required, 2D zones may be used for viewing the left menus only with the left eye and the right menus only with the right eye. The menus may separated with a space in the central portion of the screen so that only one eye sees a particular 2D zone. Tool icons may be set up at the left or right side of the display, or separate score boards may used without the need for iterating the image. With all the zones implemented, the user never needs to remove the visor for stereoscopic or two-dimensional viewing.

Improvements in system performance result when this stereoscopic invention is used. Standard split stereoscopic techniques require half the screen for the left image and half the screen for the right image, effectively reducing the total image size to half the total screen size. With this invention only a portion of the image (the left and right central zones) needs to be iterated, leaving the peripheral zones and 2D zones as separate images. Therefore, rather than losing half the total screen size, only a small portion of the total screen may be lost (depending on the size of the monitor). Assuming the same display information, this invention provides better resolution with a larger viewing area. A second improvement occurs if the image is formed using computer generated image processing. Only the central zones need to have the same portion of the image generated twice. All other zones require single image processing, reducing math transformations and improving throughput speed.

Another improvement in system performance is possible when using offscreen drawing ports. The standard approach for flicker-free graphics is to process and load an image into an offscreen buffer, display the image from the buffer, process and load the next frame into the offscreen buffer, and continue the cycle. The entire image, including the left central and peripheral zones and the right central and peripheral zones would normally be calculated and displayed in one complete screen update. However, it is possible to split the screen into two separate offscreen buffers, where the left screen port buffer contains the left central and peripheral zones, and the right screen port buffer contains the right central and peripheral zones. Under normal viewing conditions, the picture staggers due to the small delay between the left and right updated images. However, when viewed with the visor, the brain tends to integrate the left and right images, and the stagger effects are smoothed. This effect is only valid if there is a relatively small processing delay between the left and right updated images. The separate left and right offscreen drawing buffers result in an apparent update rate that is twice as fast as the update rate for a single offscreen buffer for the entire screen, without the perceived stagger between left and right updated images when viewed with the visor.

Therefore, using this invention, a simple visor using the normal interpupillary center distance can provide a large field-of-view for an extended screen display with high quality stereo images. A larger screen image is achieved, since stereo overlap is only required for the central portion of the image, and image processing speed can be improved since large portions of the screen are not iterated. The visor provides a non-critical lens focal distance and sight block baffles which allow some lateral head movement while maintaining left and right image separation.

DETAILED DESCRIPTION OF THE INVENTION

This invention uses a stereoscopic viewer, containing left and right lenses and sight block baffles contained in a lightweight frame. A display, such as computer monitor or TV, shows left and right stereoscopic images side-by-side on the central portion of the screen. The left image is extended to the left of the central stereo image area to form a left peripheral zone, and the right image is extended to the right of the central stereo image area to form a right peripheral zone. The observer's brain integrates the central stereoscopic view with the left and right peripheral zones to form an apparent three-dimensional image for the entire area. Additional two dimensional zones may be set up outside the stereoscopic area for separate objects such as menus, windows, or tool icons for viewing from the visor.

Figure 1:
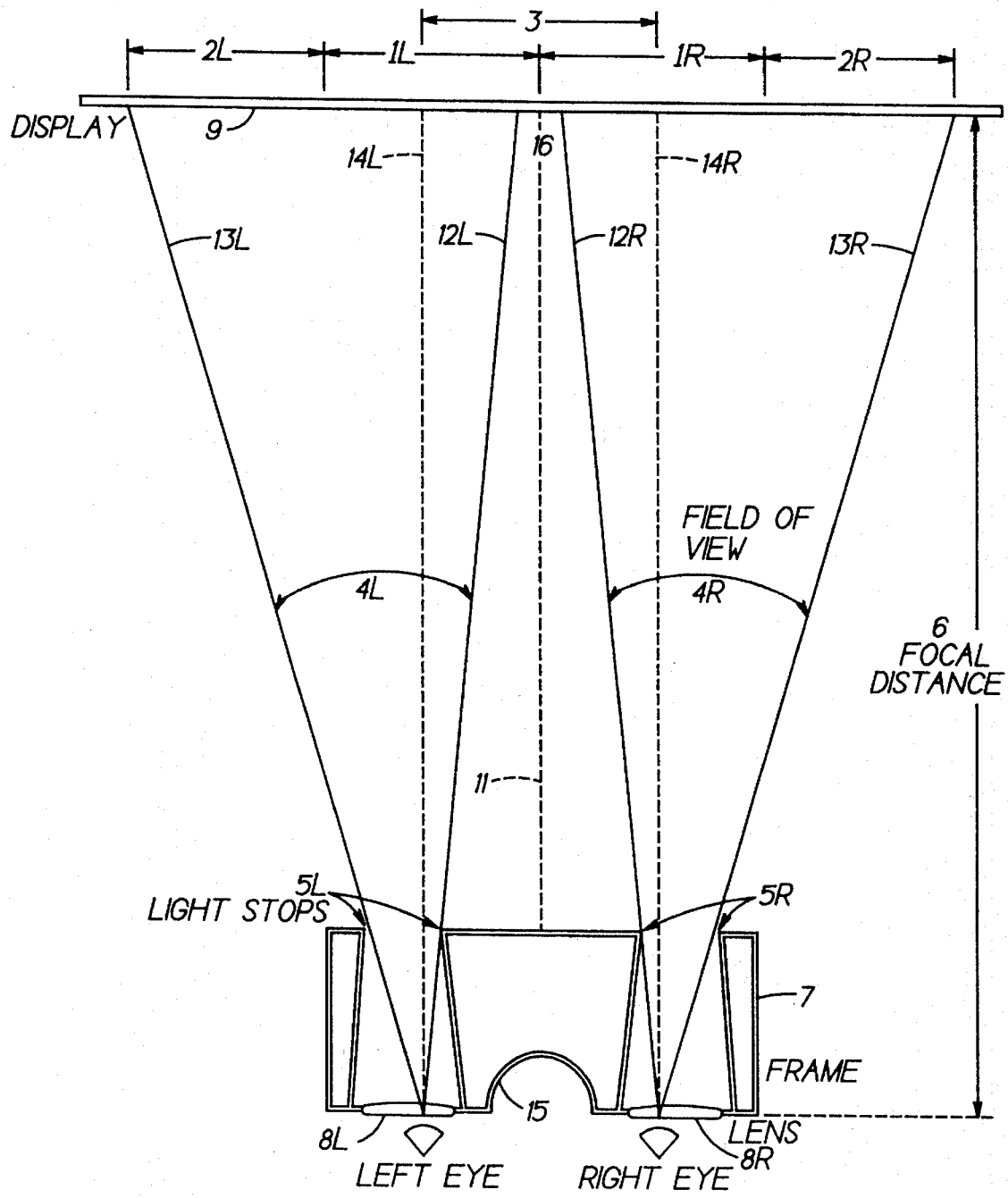
FIG. 1 shows the geometry of a visor's field-of-view with respect to the display, and shows the central and peripheral areas formed on the display.

FIG. 1 is a top view of a display screen 9, a stereoscopic visor 7 and the light path geometry between visor 7 and screen 9. Visor 7 contains two lenses 8L,8R, light stop baffles 5L,5R, and a lightweight frame 7 which holds the lenses and forms the baffles. The viewer's left and right eyes are shown at the normal interpupillary distance. The center of each lens 8L, 8R may be offset from the eyes to provide improved peripheral vision with less eye fatigue.

As can be seen from FIG. 1, display 9 is broken into several image zones: left and right central zones 1L,1R, and left and right peripheral zones 2L,2R. Dashed lines 14L,14R show the correlation between the interpupillary eye distance of visor 7 to the center spacing 3 of the left and right images 1L,1R. The width of left central zone 1L and right central zone 1R equals the interpupillary distance. The left and right images, which are viewed side-by-side, are joined at the center of the screen (shown by dashed line 11). Inner light stops 5L,5R stop each eye from seeing a small band 16 in the center of the screen. Therefore, the left and right inner baffles of visor 7 form inner field-of-view limits 12L,12R.

To the left of left central zone 1L is the image extension for the left peripheral zone 2L. To the right of right central zone 1R is the image extension for the right peripheral zone 2R. Images in left peripheral zone 2L are not contained in right peripheral zone 2R. The outer edge limits 13L, 13R of the field-of-view are formed by outer light stops 5L,5R on visor 7. This helps to contain the visual area only to the screen itself. The selection of focal length 6 of the lenses 8L, 8R sets the focal distance of visor 7 to screen 9. The light stops are adjusted to the ratio of the size of screen 9 versus the distance visor 7 is to the screen. Obviously, any size or shape of visor can be devised based on focal distance and screen size.

Figure 2:
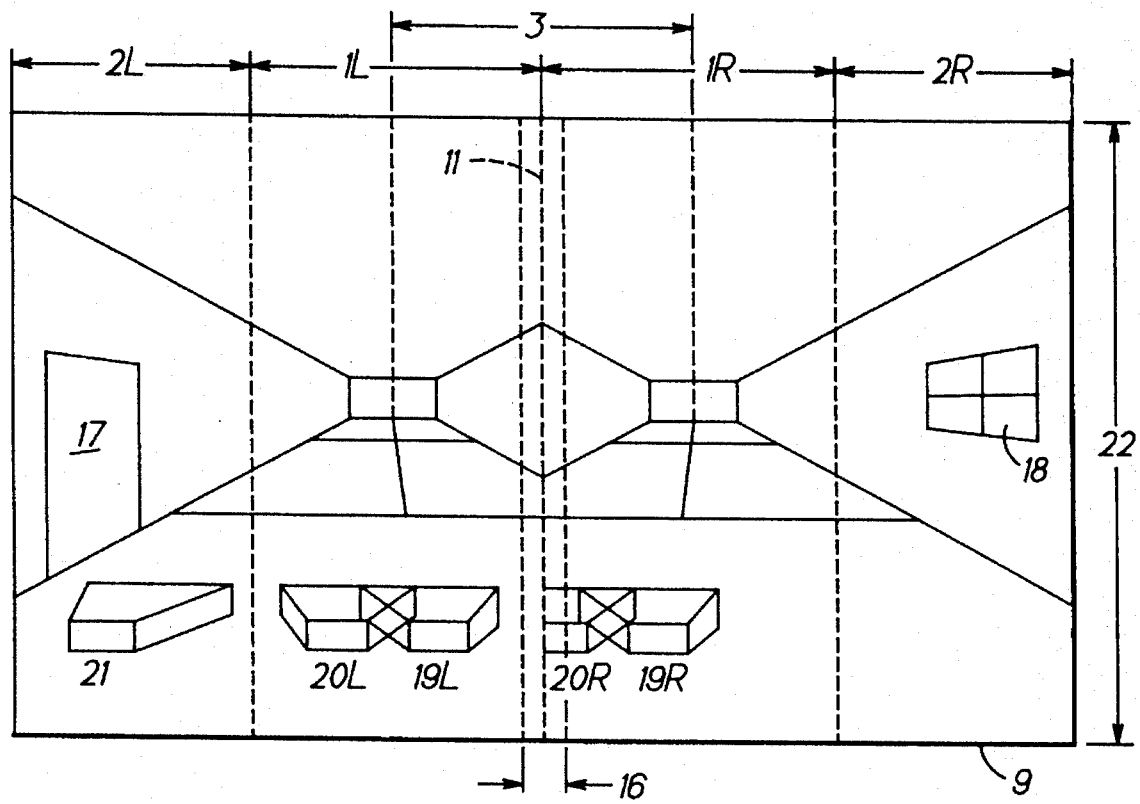
FIG. 2 is a frontal view of a display with segmented image zones, including left and right central stereoscopic zones, and left and right peripheral zones.

FIG. 2 is a frontal view of screen 9 and the image zones. The left and right central zones 1L,1R show the outline of a room from the perspectives of the left eye and right eye on split screen 9. Notice that left central zone 1L extends into left peripheral zone 2L, and the right central zone 1R extends into right peripheral zone 2R. Left and right peripheral zones 2L, 2R are not iterated with a corresponding right and left image.

The peripheral zones are areas only seen by one eye. As an example, left peripheral zone 2L shows a door 17, and right peripheral zone 2R shows a window 18. These are completely separate images, and are not contained in the other zones. The brain integrates the central stereoscopic view with left and right peripheral zones 2L, 2R to form an apparent three-dimensional image.

As a further example of the zone feature of the invention, consider blocks shown at positions 19, 20, and 21. The first block is fully shown in the left central zone 19L and in the right central zone 19R. As the block is moved to the left, the entire block remains in the left central zone 20L, but the block is chopped off in the right central zone 20R as it passes beyond the central line 11. As the block is moved even further left, the block no longer shows up in left or right central zones 1L, 1R, but is fully contained in left peripheral zone 21. It should be noted that when viewing the moving block with visor 7 on, screen 9 appears stereoscopic, and no discontinuity appears even when objects are passing through zones.

Left and right central zones 1L,1R always have the same width, which is equal to the normal interpupillary distance (approx. 60 mm), however left and right peripheral zones 2L, 2R may be extended to fill whatever screen size is required, even if display 9 is extremely large. The eyes tend to focus on the central stereoscopic image, and the peripheral vision is less important for forming the stereo views. If the user shifts the eyes to an object in a peripheral zone, the stereoscopic effect reduces, however there is no inconsistency with the visual geometry of the image.

Figure 3:
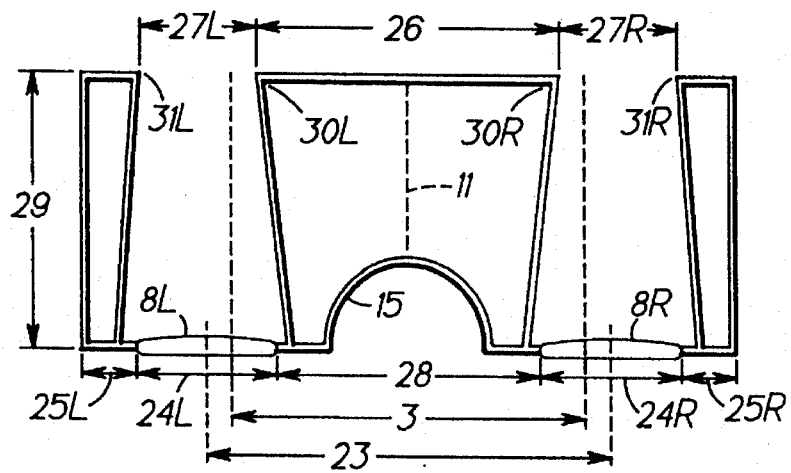
FIG. 3 shows a detailed top sectional view of the visor, including lenses, sight block baffles, and a lightweight frame structure.

FIG. 3 shows a stereoscopic visor proportioned for a screen with a 9 inch wide by 7 inch tall image, viewed at about 12 inches from the screen. Lenses 8L, 8R are planoconvex type with a 1 inch diameter and an effective focal length of 400 mm. The edge separation 28 of the lenses equals 1.75 inches, with a lens center distance 23 of 2.75 inches. The interpupillary distance 3 is 2.36 inches, which is less than the lens center spacing. Left and right inner light stops 30L,30R are formed by the separation distance 26 equal to 2 inches. Left and right outer light stops 31L,31R are spaced at distances 27L,27R equal to 1 inch. The depth of visor 29 equals 2 inches. Frame extensions 25L,25R at the ends of the visor form a peripheral vision block of external elements in the room. The cutout in the middle of the visor 15 forms a framed cutout for the nose. These dimensions are representative of one example, and there are many configurations available for given focal lengths and screen sizes.

Figure 4:
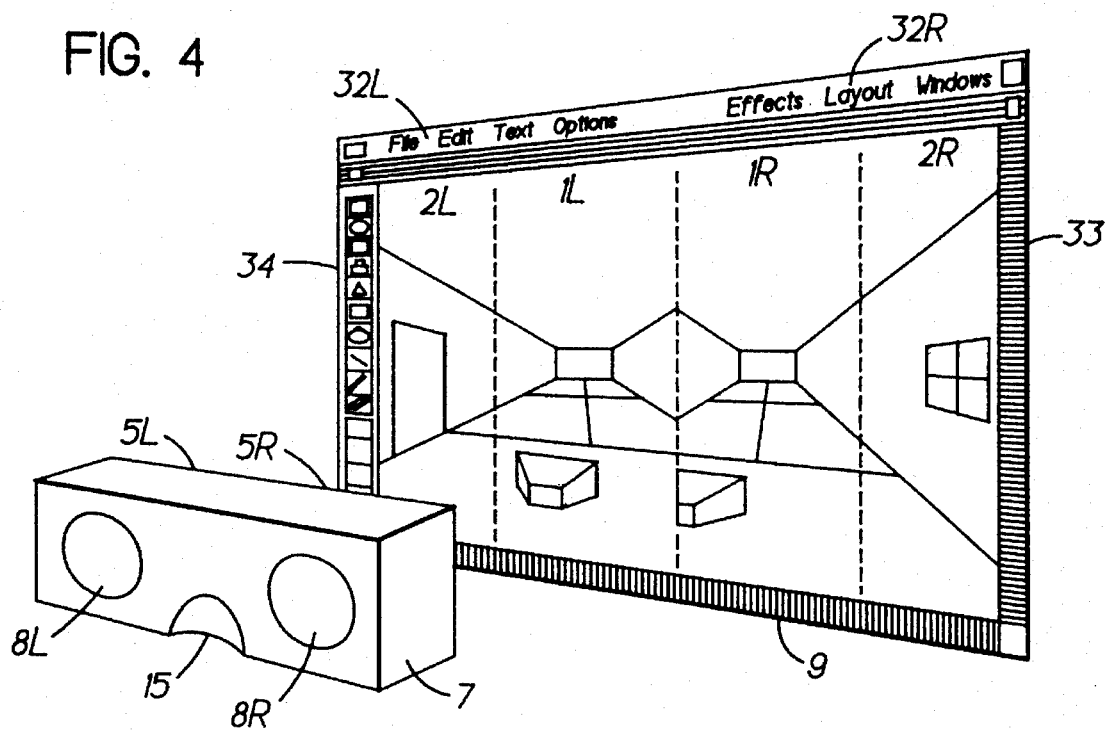
FIG. 4 is a perspective view which shows the relationship between the display and visor, and the separate central, peripheral and 2D image zones on the display.

FIG. 4 shows stereoscopic visor 7, containing left and right lenses 8L, 8R and sight blocks 5L,5R and a display 9 such as computer monitor or TV with left and right stereoscopic images 1L,1R displayed side-by-side on the central portion of the screen. The left image is extended to the left of the central stereo image area to form a left peripheral zone 2L, and the right image is extended to the right of the central stereo image area to form a right peripheral zone 2R. The brain integrates the central stereoscopic view with the left and right peripheral zones to form an apparent three-dimensional image for the entire area.

Additional two dimensional zones are illustrated outside the stereoscopic zone for separate objects such as menus 32L,32R, window scroll bar 33, or tool icons 34. The 2D zones must be set up so that only one eye can see the object when viewing through visor 7. As an example, tool icons 34 are seen only by the left eye, and window scroll bar 33 is only seen by the right eye. However, where there is potential overlap, as is the case with a menu bar, the objects must be broken into left and right zones so that only one eye can see an object. In this case the menu is split into left and right zones 32L,32R with the images either to the left or right of the centers of the central zone images. This assures that each eye will be able to see only one image of the object.

An improvement in system performance is possible when using offscreen drawing ports. The standard approach for flicker-free graphics is to process and load an image into an offscreen buffer, display the image from the buffer, process and load the next frame into the offscreen buffer, and continue the cycle. The entire image, including the left central and peripheral zones and the right central and peripheral zones would normally be calculated and displayed in one complete screen update.

Figure 6:
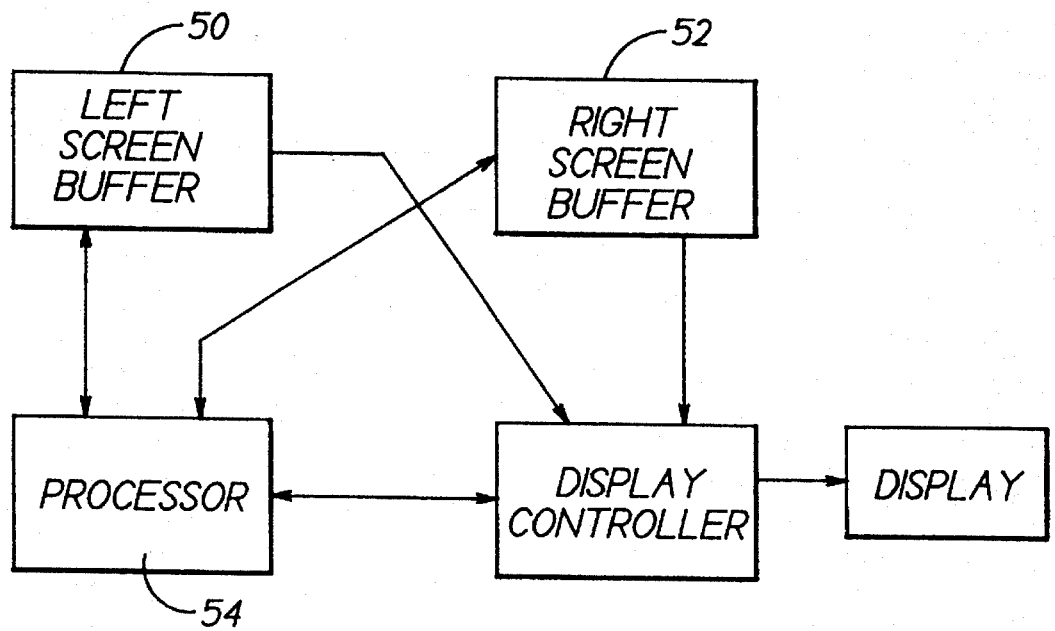
FIG. 6 is a high level block diagram which shows a buffer arrangement for driving a display to show a stereoscopic image.

However, as shown in FIG. 6, it is possible to split the screen into two separate offscreen buffers, where a left screen buffer 50 contains left central and peripheral zones 1L,2L, and the right screen buffer 52 contains right central and peripheral zones 1R,2R. Under normal viewing conditions, each of buffers 50 and 52 are updated under control of processor 54 and the picture staggers due to the small delay between the left and right updated images. However, when viewed with visor 7, the brain tends to integrate the left and right images, and stagger effects are smoothed. This effect is only valid if there is a relatively small processing delay between the left and right updated images. The separate left and right screen buffers 50, 52 result in an apparent update rate that is twice as fast as the update rate for a single screen buffer for the entire screen.

Therefore, in accord with the invention, a simple visor using the normal interpupillary center distance can provide a large field-of-view for an extended screen display with high quality stereo images. A larger screen image is achieved, since stereo overlap is only required for the central portion of the image 1L,1R. Image processing speed is also improved since large portions of the screen 2L,2R and 32,33,34 are not iterated. The visor provides a non-critical lens focal distance, and sight block baffles allow some lateral head movement while maintaining left and right image separation.

Figure 5:
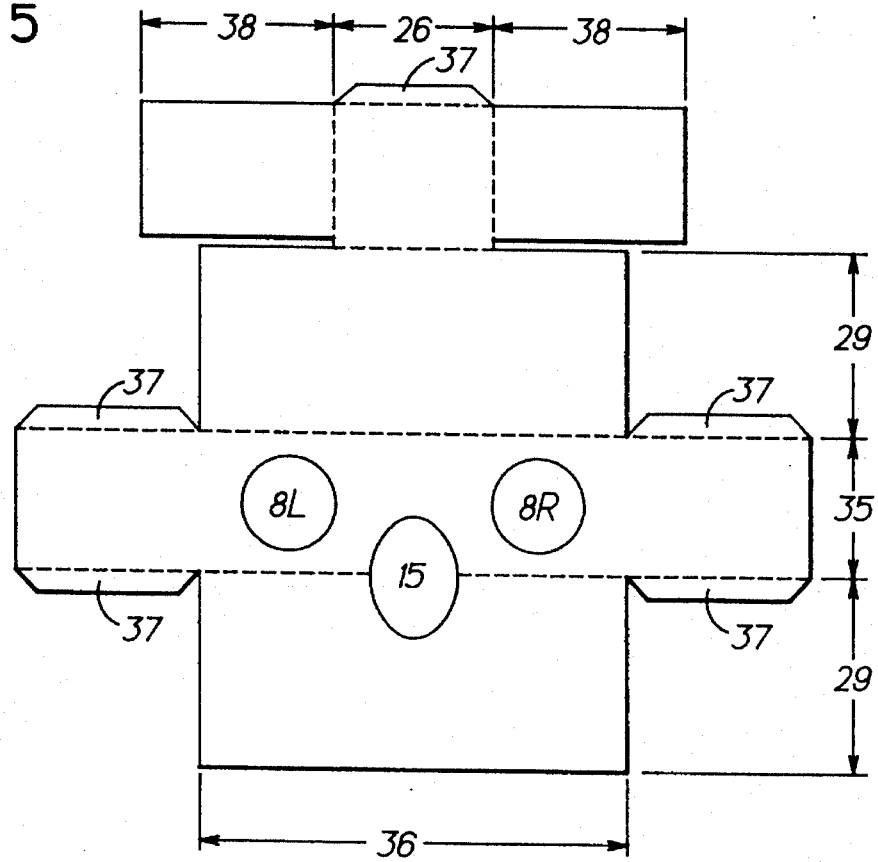
FIG. 5 shows an example of a lightweight visor frame constructed from a single piece of cardboard.

As an example of visor construction, FIG. 5 shows a single piece of cardboard that can be folded into a visor. Using the example described for FIG. 3, the dimensions 29 correspond to the depth of the visor which equals 2 inches, the height 35 of the visor equals 1.5 inches, the distance 26 between the inner light blocks equals 2 inches, and inner light block baffle distance 38 equals 2 inches. Flaps 37 are used with glue to hold the visor frame together. The holes for lenses 8L, 8R and the nose piece 15 are cut out of the cardboard. The visor can be mounted to the head by extending pieces of cardboard over the ears, by clipping onto glasses frames, or by attaching to a headset perhaps with earphones for a complete stereoscopic and stereophonic experience.

It should be understood that the foregoing description is only illustrative of the invention. Various alternatives and modifications can be devised by those skilled in the art without departing from the invention. Accordingly, the present invention is intended to embrace all such alternatives, modifications, and variances which fall within the scope of the appended claims.

What is claimed is:

1. A stereoscopic display and viewing system comprising:
   display means for showing an extended image with a large field-of-view, said extended image having portions comprising:
   left and right adjacent stereoscopic central images, said stereoscopic central images having an approximate center to center separation equal to an interpupillary distance, each stereoscopic central image having a width of approximately said interpupillary distance, and
   left and right peripheral images that are, respectively, leftward and rightward extensions of said left and right adjacent stereoscopic central images; and
   binocular viewing means employable by a user and including right and left lenses for enabling said user to view all of said portions of said extended image on said display means, said viewing means including right and left inner light stops positioned between said lenses for restricting light from said right central image and right peripheral image from entering said left lens, and light from said left central image and left peripheral image from entering said right lens, when said right and left lenses are positioned approximately equidistantly from an imaginary line emanating perpendicularly from said display and originating at a joinder of said left central image and right central image, whereby the user may view all of said portions of said extended image with a stereoscopic effect throughout said large field-of-view.

2. The stereoscopic display and viewing system as recited in claim 1, wherein said viewing means further includes a right outer light stop which prevents light from entering said right lens that originates to the right of said right peripheral image and a left outer light stop which prevents light from entering said left lens that originates to the left of said left peripheral image.

3. The stereoscopic display and viewing system as recited in claim 1 wherein said display means further comprises:
   left screen buffer means for storing data defining the left central image and left peripheral image;
   right screen buffer means for storing data defining the right screen central image and right peripheral image; and
   processor means for updating said left screen buffer means and right screen buffer means in an alternate fashion so as to provide an apparent doubling of the update rate thereof.

4. The stereoscopic display and viewing system as recited in claim 3 wherein said display means is an electronically operated display which requires periodic refresh signals.

5. The stereoscopic display and viewing system as recited in claim 1 wherein said extended image on said display means further comprises an image portion that is viewable only through said left lens when said left and right lenses are positioned for stereoscopic viewing of said stereoscopic central images.

6. The stereoscopic display and viewing system as recited in claim 1 wherein said extended image on said display means further comprises an image portion that is viewable only through said right lens when said left and right lenses are positioned for stereoscopic viewing of said stereoscopic central images.

7. The stereoscopic display and viewing system as recited in claim 1, wherein said right and left peripheral images extend to outer right and left limits of said display means.

8. The stereoscopic display and viewing system as recited in claim 1, wherein said right and left lenses comprise a simple pair of lenses of one of the types including plano-convex, double convex and meniscus lenses.

9. The stereoscopic display and viewing system as recited in claim 1, wherein said right and left lenses comprise a simple pair of lenses having a large effective focal length for allowing increased distance to the display.

10. The stereoscopic display and viewing system as recited in claim 9, wherein said binocular viewing means comprises extended sight block baffles.

11. The stereoscopic display and viewing system as recited in claim 1, wherein said binocular viewing means have the interpupillary eye distances offset from the center of the right and left lenses to increase the side peripheral viewing.

* * * * *